United States Patent
Goldman et al.

(10) Patent No.: US 8,429,077 B2
(45) Date of Patent: Apr. 23, 2013

(54) WEB ENABLED BANK TELLER MACHINE

(75) Inventors: Dmitry Goldman, Brooklyn, NY (US); Walter Gero, Amityville, NY (US); John Henderson, Smithtown, NY (US); Kenneth Chang, West Windsor, NJ (US); Robert Bucko, Deer Park, NY (US); Frank Kirby, Freeport, NY (US); Adrienne Puttagio, Farmingdale, NY (US); Medhat Kamal, Bronxville, NY (US); Jinlin Ding, Forest Hills, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1599 days.

(21) Appl. No.: 10/266,838

(22) Filed: Oct. 7, 2002

(65) Prior Publication Data
US 2003/0066876 A1 Apr. 10, 2003

Related U.S. Application Data

(60) Provisional application No. 60/327,517, filed on Oct. 5, 2001.

(51) Int. Cl.
*G06Q 40/00* (2006.01)
(52) U.S. Cl.
USPC ................................................. 705/43
(58) Field of Classification Search ............... 705/1–50; 235/1–395; 715/6, 702
See application file for complete search history.

(56) References Cited

U.S. PATENT DOCUMENTS

| | | | |
|---|---|---|---|
| 4,641,239 A * | 2/1987 | Takesako | 705/41 |
| 5,389,773 A | 2/1995 | Coutts et al. | |
| 5,705,798 A | 1/1998 | Tarbox | |
| 5,897,625 A * | 4/1999 | Gustin et al. | 705/43 |
| 5,915,246 A * | 6/1999 | Patterson et al. | 705/43 |
| 5,999,624 A * | 12/1999 | Hopkins | 705/70 |
| 6,002,392 A * | 12/1999 | Simon et al. | 715/702 |
| 6,149,055 A | 11/2000 | Gatto | |
| 6,213,391 B1 | 4/2001 | Lewis | |
| 6,366,967 B1 * | 4/2002 | Wagner | 710/33 |
| 6,796,496 B2 * | 9/2004 | Andersen et al. | 235/380 |
| 7,661,590 B1 * | 2/2010 | Gatto | 235/384 |
| 2001/0044747 A1 * | 11/2001 | Ramachandran et al. | 705/16 |
| 2002/0003162 A1 * | 1/2002 | Ferber et al. | 235/14 |
| 2002/0026575 A1 * | 2/2002 | Wheeler et al. | 713/156 |
| 2002/0091843 A1 * | 7/2002 | Vaid | 709/230 |
| 2003/0066876 A1 * | 4/2003 | Goldman et al. | 235/379 |

OTHER PUBLICATIONS

Norwest bank staff, Community reinvestment act performance evaluation; Oct. 17, 1996, Administrator of National banks, pp. 1-15.*
U.S. Appl. No. 11/185,847, filed Jul. 21, 2005.

* cited by examiner

*Primary Examiner* — Marissa Liu
(74) *Attorney, Agent, or Firm* — Goodwin Procter LLP

(57) ABSTRACT

A system and method is provided for an ATM having a display, a logic server coupled to the display, and a memory coupled to the logic server. The logic server dynamically controls the content of screens to be displayed on the display. The memory, which is accessible to the logic server, contains a profile of at least one user.

In operation, the ATM detects the swipe of a user's card and requests the profile of the user whose card was swiped from a host. The ATM then receives the user's profile and stores the user's profile in the ATM.

15 Claims, 9 Drawing Sheets

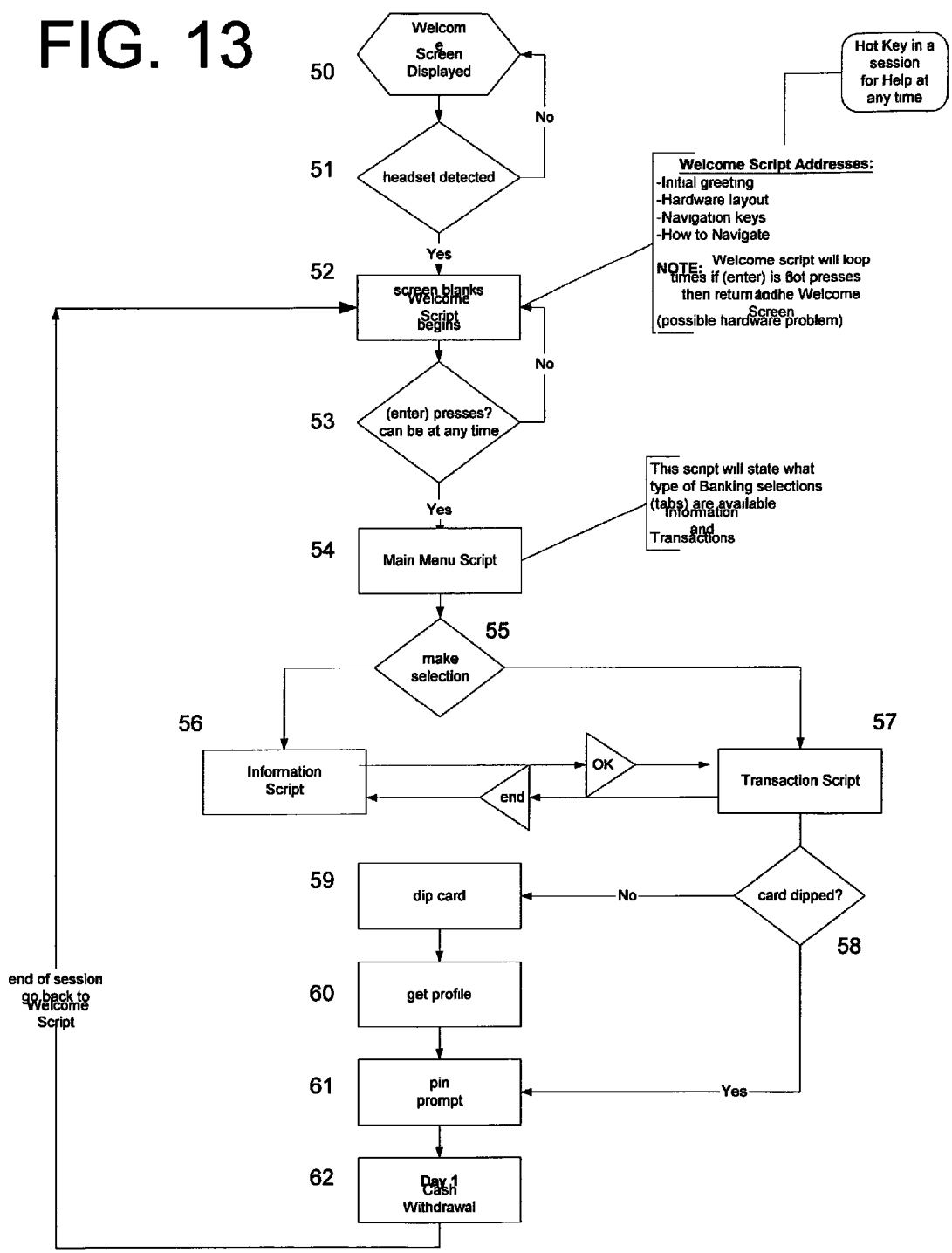

WEB ENABLED BANK TELLER MACHINE

CROSS REFERENCE TO RELATED APPLICATIONS

This application claims priority to U.S. Provisional Application No. 60/327,517, filed on Oct. 5, 2001, the entirety of which is incorporated herein by reference.

FIELD OF THE INVENTION

The present invention generally relates to automated banking machines and more particularly relates to an automated banking machine that is dynamically updated from a host system.

BACKGROUND OF THE INVENTION

Automated banking machines are well known. A common type of automated banking machine used by consumers is an Automated Teller Machine (hereinafter "ATM"). ATMs enable customers to carry out a variety of banking transactions by interacting with the machine rather than a human teller. Examples of banking transactions that are commonly carried out using ATMs include withdrawals, deposits, transfer of funds between accounts, payment of bills, and account balance inquiries. The types of transactions that a customer may carry out at a particular ATM are determined by hardware and software configuration of that particular ATM as well as the hardware and software configuration of the institution to which the particular ATM is connected. Other types of automated banking machines may allow customers to charge against accounts, or print or dispense items of value such as statements, coupons, tickets, wagering slips, vouchers, checks, food stamps, money orders, scrip or travelers checks.

The architecture of prior art ATMs renders these machines extremely inflexible. Current ATM architecture is based on traditional hierarchical software and a closed system. Most significantly, the functionality offer through an ATM is fixed at the time the ATM is physically installed or physically visited for purposes of upgrading the machine. The software used for the operation of the ATM is typically contained in firmware installed in the machine, which is fixed and difficult to upgrade. Furthermore, when in operation, the ATM acts primarily as a "dumb" terminal to the remote host (i.e., the financial institution). Little if any logic related to a customer's session with the ATM is contained within the ATM, but is rather stored and executed at the host site. This traditional approach to ATM design and operation results in long development time, increased time to market, inflexible and expensive upgrades, inflexible user functionality, inflexible user interfaces and inordinate dependency on hardware and software developers.

Prior art ATMs are typically connected to proprietary communications networks in order to allow customers to use ATMs provided by those other than its own financial institution. These networks interconnect the ATMs operated by financial institutions and other entities. Some examples of these networks include the NYCE™ and STAR™ systems. The interconnection capability of these networks enables a user to access his accounts at his own financial institution while using a banking machine operated by different institution. This interconnection capability is available so long as the foreign institution's banking machine is connected to a network (e.g., NYCE™ to which the user's home financial institution is also connected. When using such a "foreign" ATM, the user is limited to the transaction options provided by the foreign institution and the options available at the specific ATM being used.

A customer may encounter difficulties when using a foreign institution's ATM. Such difficulties may occur because the user is not familiar with the type of machine operated by the institution. Customer confusion may result because the customer does not know which buttons or other physical mechanisms are required to be actuated to accomplish the desired transactions. Furthermore, the transaction flow (e.g., the series of menu options) presented to a customer at a foreign institution's machine may be significantly different from the machines with which the customer is familiar at the user's institution. This is a problem particularly when the user is from another country and is not familiar with the type of banking machine or the language of the interface provided by the (truly) "foreign" institution. Likewise, the documents, that are generated by the ATM printer, are generally limited to a limited group of defined formats in a single language (e.g., English). Further, the user may be presented with options that are inappropriate for the user's accounts.

A foreign institution's ATMs may also provide more, less, or a different type of transaction than the user is familiar with at their home institutions ATMs. For example, the ATMs at the user's home institution may enable the transfer of funds between the user's accounts. This particular transaction enables the user to maintain funds in higher interest bearing accounts until they are needed. If the foreign institution does not provide this capability, the user will be unable to perform this familiar (and sometimes necessary) function when operating the foreign ATM machine. The inability of a user at a foreign machine to conduct the transactions to which they are accustomed may present problems (e.g., transferring funds into a checking account prior to a scheduled automatic withdrawal.

Communication over wide area networks enables messages to be communicated between distant locations. The best known wide area network is the Internet, which can be used to provide communication between computers throughout the world. In the past, the Internet has not been widely used for financial transaction messages, as it is not inherently a secure system. Messages intended for receipt at a particular computer address may be intercepted at other addresses without detection. Because the messages may be intercepted at locations that are distant in the world from the intended recipient, there is potential for theft and fraud.

Approaches are being developed for more secure transmission of messages on the Internet. Encryption techniques are also being applied to Internet messages. However, the openness of the Internet has limited its usefulness for purposes of financial messages, particularly financial messages associated with the operation of automated banking machines.

Messages in wide area networks may be communicated using the Transmission Control Protocol/Internet protocol ("TCP/IP"). U.S. Pat. No. 5,706,422 illustrates an example of a system in which financial information stored in databases is accessed through a private wide area network using TCP/IP messages. The messages transmitted in such networks, which use TCP/IP, may include "documents" (also called "pages"). Such documents are produced in Hypertext Markup Language ("HTML") which is a reference to a type of programming language used to produce documents with commands or "tags" therein. The tags are codes, which define features and/or operations of the document such as fonts, layout, imbedded graphics, and hypertext links. HTML documents are processed or read through use of a computer program referred to as a "browser." The tags tell the browser how to process and control what is seen on a screen and/or is heard on speakers connected to the computer running the browser when the document is processed. HTML documents may be transmitted over a network through the Hypertext Transfer Protocol ("HTTP"). The term "Hypertext" is a reference to the ability to embed links into the text of a document that allow communication to other documents, which can be accessed in the network.

As shown in FIG. 1, an ATM 2 communicates with a host processor 6 across a network 4. The host processor 6 is operated by the institution responsible for the operation of the ATM 2, typically a financial institution (i.e., a bank). Although not shown, multiple ATMs can be connected to the host 6 through the network 4. Furthermore, multiple hosts can be connected to the network 4 to service the multiple ATMs. ATM 2 is capable of performing self-testing and notifying the host 6 when a problem is detected, e.g., no cash, no receipt, or no deposits. In response to such a notification from the ATM 2, the host 6 modifies its control of the ATM's display so that a user will be aware of an existing problem or limited service available at the malfunctioning ATM 2.

To use the system shown in FIG. 1, a user first swipes a bank card through the card reader that is part of the ATM machine 2. The card typically has a magnetic strip containing user data. The user is then prompted to enter a personal identification number ("PIN"). The ATM 2 then communicates across the network with the host 6. The user's account information is pulled and transmitted to the ATM 6. Using this prior art system, no customer specific information reaches the ATM until after the user has entered its PIN.

SUMMARY OF INVENTION

In accordance with an exemplary embodiment of the present invention, a system and method is provided for an automated teller machine (ATM). In accordance with an exemplary embodiment of the present invention, a system and method is provided for an ATM having a display, a logic server coupled to the display, and a memory coupled to the logic server. The logic server dynamically controls the content of screens to be displayed on the display. The memory, which is accessible to the logic server, contains a profile of at least one user.

In use, the ATM detects the swipe of a user's card. After the swipe is detected, the ATM requests a profile of the user whose card was swiped. The ATM then receives the user's profile and stores the user's profile in the ATM. The profile is stored in a memory accessible to the logic server.

The ATM is part of a larger banking system. The system includes a host, an ATM unit, and a network coupled to the host and ATM. The ATM has a display, a logic server coupled to the display and a memory. The logic server controls the content of screens to be displayed on the display, and the memory contains a profile of at least one user. The ATM and the host communicate with each other over the network. The ATM requests user profiles from the host. The host provides the profiles to the ATM over the network. The profiles are then stored at the ATM in a memory.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 13 is a flowchart of a transaction in ADA mode.

DETAILED DESCRIPTION OF THE INVENTION

Figure 2:
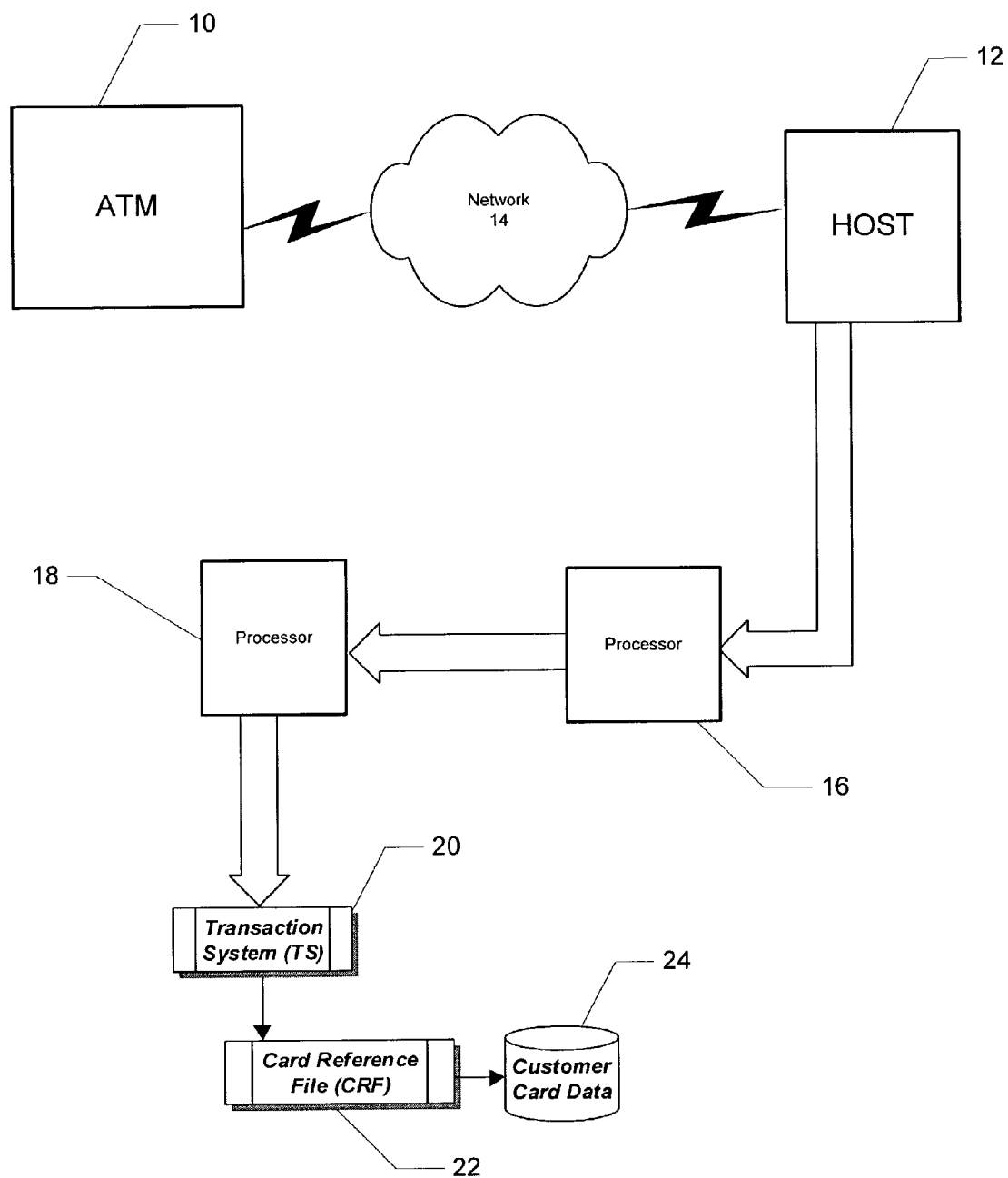
FIG. 2 is a depiction of a system according to one embodiment of the invention.

FIG. 2 depicts the technical framework in which a web enabled ATM 10 operates in accordance with the present invention. The overall system comprises the web enabled ATM 10 that is connected to a host 12 across a network 14. Host 12 stores a user's profile, i.e., fast cash preference, language preference, and the like. Further, a host 12 can authorize withdrawals up to a specified limit when a user's account data is unavailable or inaccessible. Network 14 can be a proprietary virtual private network, a DSL system, an ISDN network, T-1 lines, the Internet, and the like. The host 12 is connected to a delivery processor 16 that hosts middleware applications. Delivery processor 16 performs routing and reformatting functions. Delivery processor 16 acts as a transaction switch, interfacing the host to the account system files. The delivery processor 16 is in turn connected to the processor 18. Processor 18 controls access to profile data. Information stored under the control of processor 18 is transferred to the host 12 to be accessed and utilized by the ATM 10. Processor 18 contains a transaction system 20 ("TS") and card reference file 22 ("CRF") applications. The TS 20 and CRF 22 applications interface with the customer card data stored in database 24.

Web enabled ATM 10 is a fully functional ATM in that it can accept deposits, dispense withdrawals, print receipts and statements, and provides a headphone jack for use by sight impaired users. In one embodiment of the present invention, ATM 10 is regulated by fraud and compliance systems operating in a client server environment. In a preferred embodiment, the ATM 10 utilizes an Ethernet TCP/IP telecommunications network 14 between the ATM 10 and Tandem host 12. ATM 10 can also utilize a wireless telecommunications network or any other communication system where messages can be transferred in a secure fashion.

Figure 3:
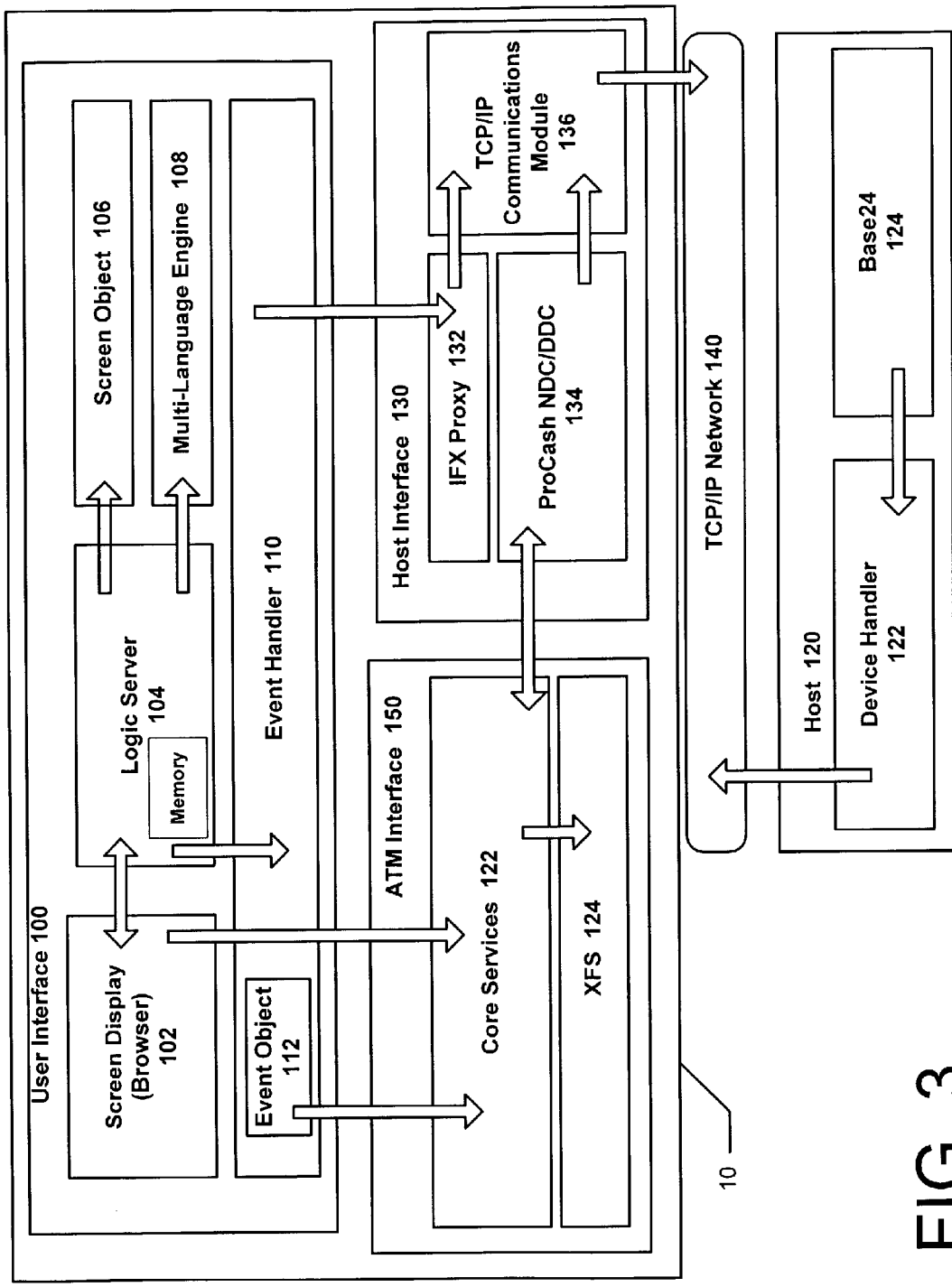
FIG. 3 is an architecture and software overview.

FIG. 3 is an architecture and software overview. The major components of the system include a user interface 100, ATM interface 150, a host interface 130, TCP/IP network 140, and host 120.

The user interface 100 is the portion of the ATM 10 which enables a user to conduct various transactions at an ATM both by displaying information to the user as well as responding to the user instructions. Screen 102 displays the transaction options available to a user, displays the user's account information such as balances, displays instructions and in general, displays all of the information required by the user to interact with the ATM 10. As an alternative to the display screen 100, the system of the present invention may interact with the user through aural communication.

The logic server 104 determines the options made available to the user. Logic server 104 utilizes inputs from screen object section 106, multi-language engine 108, event handler 110, and ATM interface 150 to determine the options to display to the user.

Initially, when a user swipes a bank card through the card reader of the ATM 10, a message is sent to the host 120. The host 120 retrieves the customer's profile data (through elements 18, 16, 20, 22, and 24 in FIG. 2) and returns the user's profile to the logic server 104. The user's profile is stored in a memory that can be accessed by the logic server. The user's profile is transmitted as an IFX message in an XML packet. Logic server 104 reviews the customer's unique profile and determines which screen objects 106 to display and what language to use. Various language screens are generated using language engine 108. Depending upon the profile attributes received by logic server 104, i.e., language preference, the PIN entry screen is displayed the language specified by the profile. In a preferred embodiment of the invention, English is the default language. In one embodiment of the invention, the user profiles received by the ATM are stored in a database maintained and updated at the ATM.

In the transmission from host 120, logic server 104 receives other attributes including account types and rights associated with a given bank card. For example, a bank card for a business may be allowed access to deposits only, so that employees using the card cannot make withdrawals or view balances. The logic server 104 modifies the display and the options available to the user based on the business rules contained therein and the customer specific attributes transmitted from host 120.

The ability of the ATM 10 of the present invention to receive a user's profile is an extremely valuable tool for offering additional services to a user. A user's profile can contain more than an account listing, rights, and balances. The profile can contain a credit rating, recent purchases, i.e., a home, outstanding loans, and the like. Logic server 104 can be programmed with a series of business rules to analyze the user's profile and offer additional services. For example, if the user has an overdraft balance and a mortgage, an offer for a second mortgage or refinancing may appear. Similarly, if the user has a large balance in a savings or checking account brokerage or other investment services may be offered.

Logic server 104 interacts with event handler 110 to process hardware events from the physical portions of the ATM 10. The event handler 110 passes messages to the logic server 104 that relate to the functioning of the ATM. ATM interface 120, and specifically core services portion 122 passes these messages to event handler 110 to provide notification of hardware events to logic server 104. Core services portion 122 constantly monitors the operation of the physical portions ATM 10 (e.g., the cash dispenser, the deposit receiver, the printer). If a portion of the unit malfunctions or the ATM 10 is unable to perform a task, such as dispense cash, a hardware event occurs. This hardware event is provided to the logic server 104, which in conjunction with screen object 106, will remove the "withdrawal" button from the display (for this particular hardware event). In one embodiment of the invention, the display screen will also be modified by logic server 104 to notify users that the ATM 10 is unable to perform a function, such as dispense cash, prior to the user swiping the bank card.

All of the actions taken by logic server 104 are governed by various business rules. Business rules are implemented as programming logic contained within the logic server 104 in the ATM 10. These business rules, in one function, streamline the user's session by eliminating transactions not available to the user. This is a significant departure from prior art ATMs where the same transactions options are displayed at the ATM to every user, and are then denied by the host when it is determined that the requested transaction is not available to the user. With web-enabled ATM 10 of the present invention, the "intelligence" is available within the ATM 10 itself, to logically control the menu options, such as the buttons and accounts, using business rules logic. As previously described, the pre-defined business rules interact with the user's unique profile (transmitted to ATM 10) to control the screen and options available to the user. For example, if the user's received profile indicates that card being employed by the user is only authorized to make deposits and not withdrawals, the options for making withdrawals is never presented to the user.

In a preferred embodiment of the present invention, business rules are implemented at a high level control in an Institution Definition File (IDF). In this embodiment of the invention, an IDF is defined for each proprietary card type and is contained in the user's profile associated with the card. In this IDF, there are two attributes or flags available, one to allow PIN Change and one to allow Profile Changes. These parameters are set to a "Yes" or "No" as to whether or not to allow these Pin and Profile change operations.

In general, all customers using the web-enabled ATM 10 of the present invention have the ability to perform the same transactions that they can perform with the prior art ATMs. In a significant departure from the prior art, however, if a customer was unable to perform a transaction in a prior art ATM (e.g., transfers between accounts because the user only had one account) the ATM 10 of the present invention does not even present that option to the user. For example, if the customers cannot perform account transfers, the ATM 10 never displays the transaction button associated with that function to the user. As previously described, the modification of the selection menus is performed locally by the logic server 104 operating on the pre-defined business rules and the customer profile.

Figure 4:
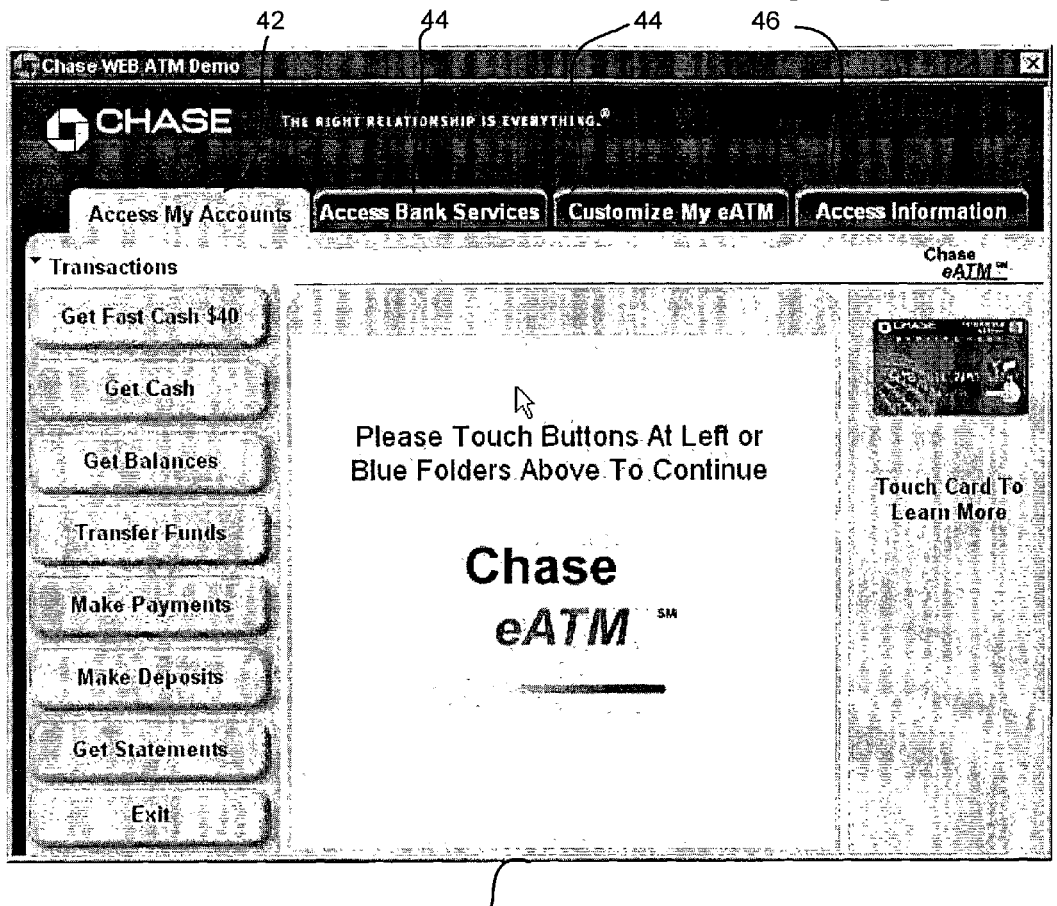
FIG. 4 shows a typical ATM screen according to the invention.

FIG. 4 illustrated an example of a preferred ATM screen 40 presented to the user in accordance with the present invention. At the Main screen 40 the following folder tabs are active/available: Access My Accounts 42; Access Bank Services 44; Access Information 46; and Customize My eATM 48. The information displayed is modified as various business rules are executed against the customer's profile. For example, in one embodiment of the present invention, the "Get Fast Cash" button is not displayed when: a proprietary customer does not have a checking account; a customer is using a proprietary credit card; a customer is using a business limited function card (deposit only); customer profile contains a checking account indicator of "deposit only allowed"; or the ATM 10 is unable to dispense cash. As seen above, some of these conditions which cause the displayed options to be modified are found in the customer profile and some relate the physical conditions at the specific ATM 10 being used by the customer.

In another embodiment of the present invention, there are also business rules that determine when the "Get Cash" button is or is not displayed. The "Get Cash" button is not displayed when: a customer is using a business limited function card (deposit only) or when the ATM is unable to dispense cash. Additionally, the accounts that can be displayed are determined by logic server 104 according to predefined rules and the customer's profile. For example, checking accounts are not displayed when a customer is using a proprietary credit card, a customer is using a business limited function card (deposit only), or customer profile returns an account indicator of "deposit only allowed." Similar rules also exist regarding the display of saving accounts and credit accounts.

To streamline ATM use, the "Transfer Funds" button is not displayed when the user does not have more than one account or if the user is utilizing a business limited card. Additionally, the display of accounts available for "transfer from" and "transfer to" change in response to the selections that are made by the customer as well as in response to the attributes (i.e., the customer's actual accounts) contained in the user's profile. For example, credit accounts are not displayed as a transfer destination when a user elects to transfer funds from a credit account and a selected account will not appear in both the "transfer from" and "transfer to" categories.

Business rules also exist for the "Make Deposit" and "Get Statement" buttons. The business rules are based on account types, card functionality, card rights, availability of banking institution records, ATM functionality, or status, and the like. As discussed above, if logic server 104 receives a hardware event that a printer is malfunctioning or out of paper, the display items associated with the malfunctioning equipment are not displayed (e.g., Print a Statement).

The ATM 10 of the present invention allows users to customize the ATM 10 features and functionality through their profiles. For example, users can change their PIN, customize the fast cash amount, change the language preference, establish defaults for fund transfers, and the like. Additionally, users can schedule one time and recurring payments through the ATM 10.

When a user customizes a feature of the ATM 10, this data is transferred from the host interface 130 (FIG. 3) across the TCP/IP network 140 to the host 120 where it the customization changes are permanently stored in the customer's profile contained in the database 24. The ATM 10 communicates with host 120 using Interactive Financial Exchange ("IFX") and NDC format commands. However, all communication can be conducted using IFX commands or other command formats.

IFX is an XML-based communication protocol that enables the exchange of information between financial institutions and their customers, their service providers, and other financial institutions. IFX was initially developed for Internet banking, not for ATM applications. IFX commands are used for PIN change, profile request, and profile preference change. No corresponding commands exist for these functions in the NDC format. Additionally, IFX can be used for withdrawal, balance inquiry, statement, deposit, payment, and transfer commands.

As shown in FIG. 3, to accommodate the IFX command format, the host interface 130 has an IFX proxy module 132 and the host 120 has a corresponding device handler 122. In one embodiment of the invention, device handler 122 translates IFX format commands into Base24, an industry standard program language. The use of IFX allows more complex communication between the host 120 and the ATM 10. The NDC command format does not support interactive commands, as does IFX. Further, IFX has been expanded herein to include such features as profile requests, previously unavailable in an ATM.

Figure 1:
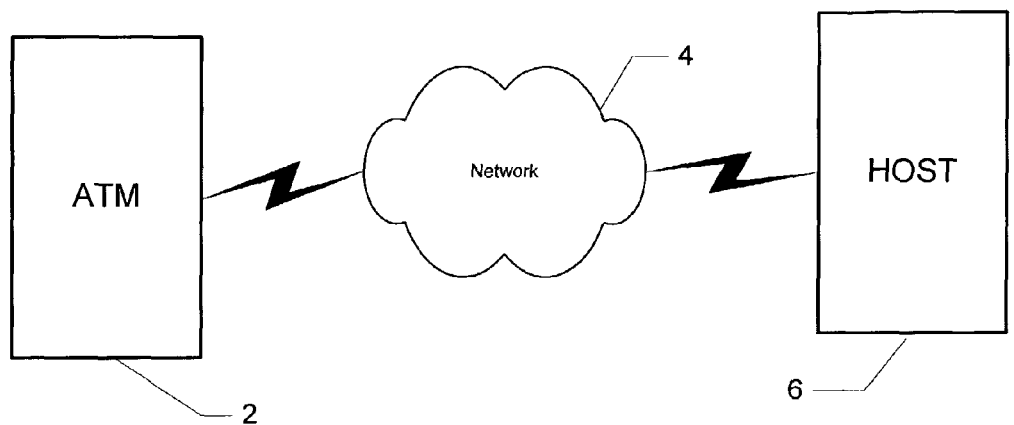
FIG. 1 is a depiction of a prior art system.
Figure 5:
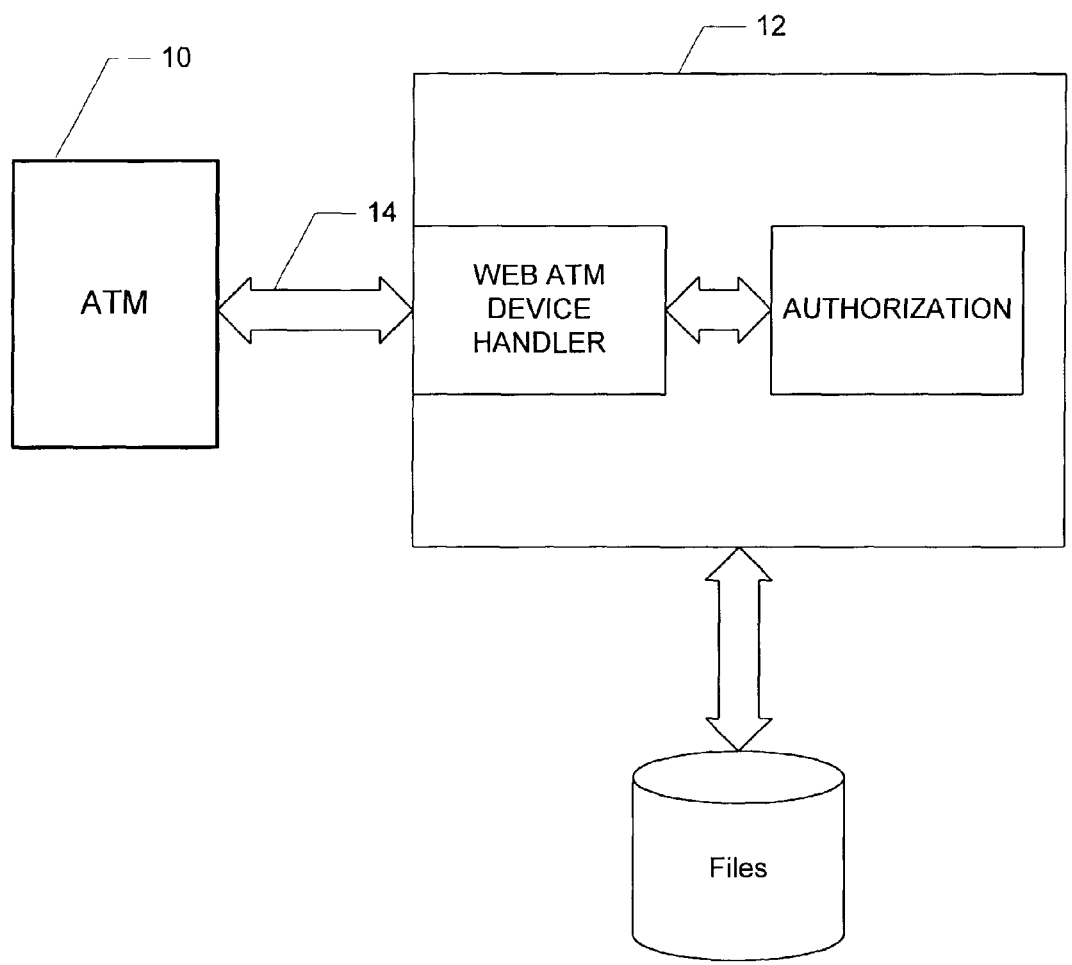
FIG. 5 is a depiction of a system according to one embodiment of the invention.

FIG. 5 is a depiction of a system according to one embodiment of the invention. The ATM 10 communicates with a host 12 to authenticate users. Once a user is authorized, information stored in the host's files is accessible to the ATM 10. The host stores a user's profile, which is updated, as required, by processors 16 and 18. When a user attempts to make a withdrawal, the host 12 will verify funds in the user's account with processor 18. If processor 18 is unavailable host 12 is able to authorize a withdrawal. The amount of the withdrawal is stored and the users account is updated when processor 18 is available. In one embodiment, a user can withdraw a maximum amount without receiving fund availability from processor 18. In one embodiment of the invention, the relevant files regarding a user are transmitted to the ATM including current balances. In this manner, the ATM 10 does not have to constantly seek information from the host 12. After a transaction is completed, the ATM will send a message to the host 12 updating the current account balances. In one embodiment of the invention, only one ATM can access an account at a time to prevent multiple withdrawal of the same funds.

Figure 6:
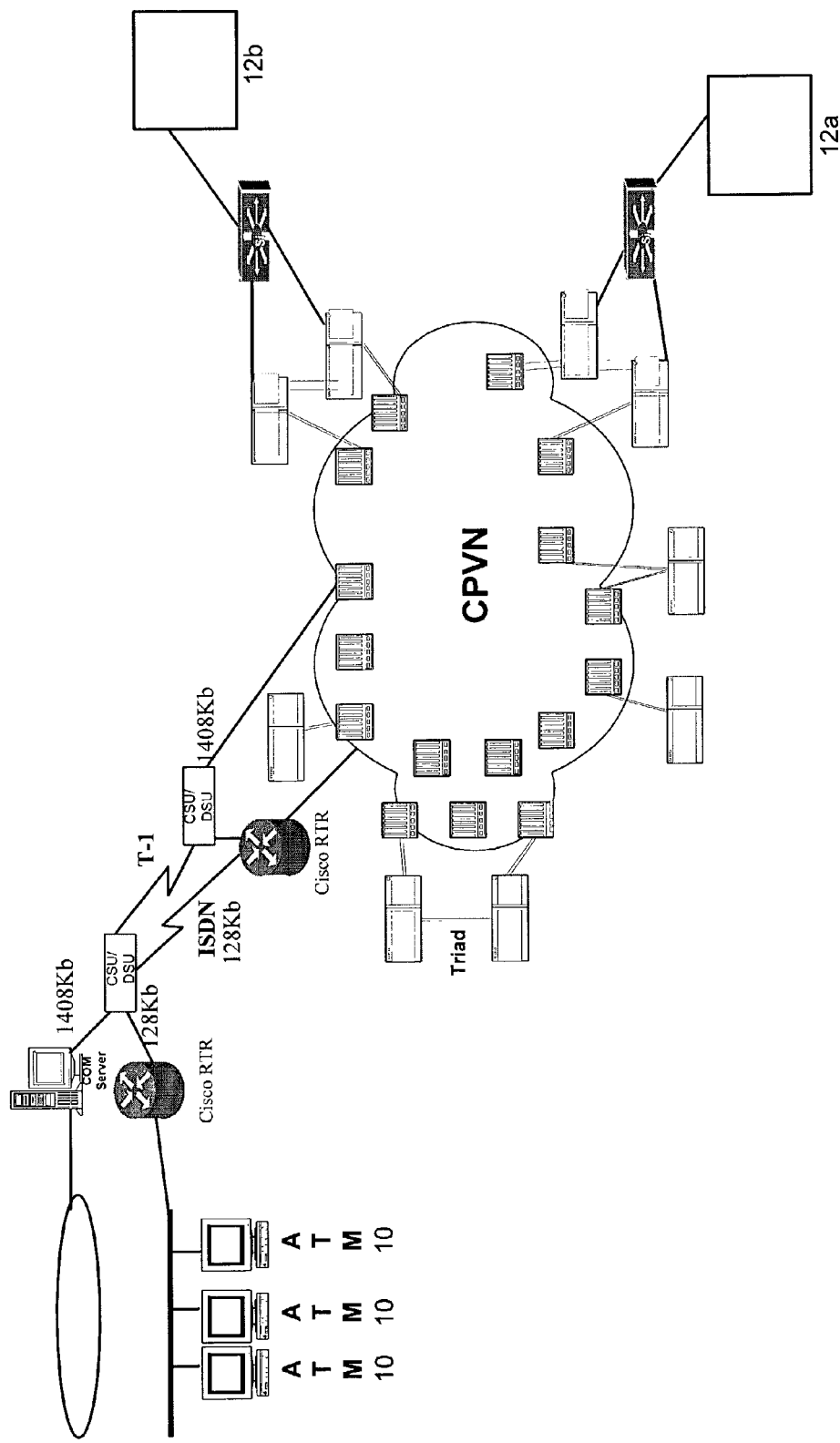
FIG. 6 is a depiction of the network infrastructure according to one embodiment of the invention.
Figure 7:
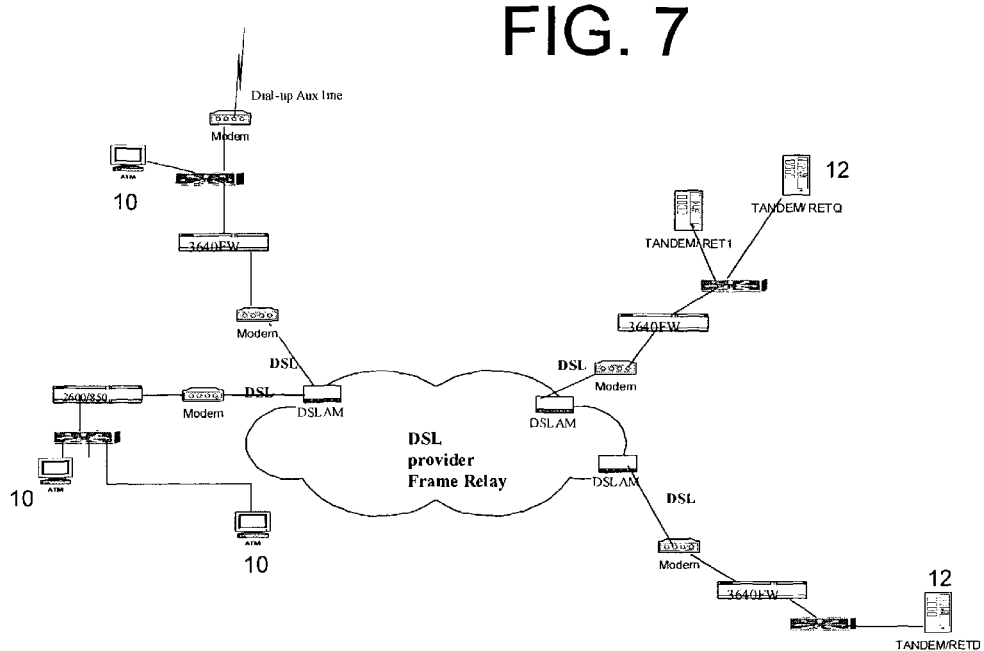
FIG. 7 is a depiction of the network infrastructure according to one embodiment of the invention.
Figure 8:
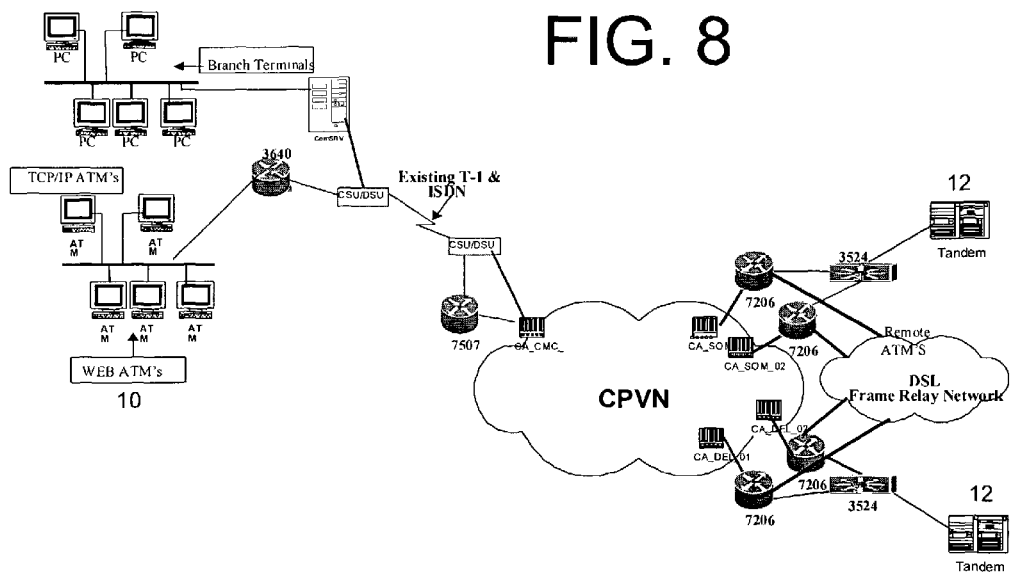
FIG. 8 is a depiction of the network infrastructure according to one embodiment of the invention.
Figure 9:
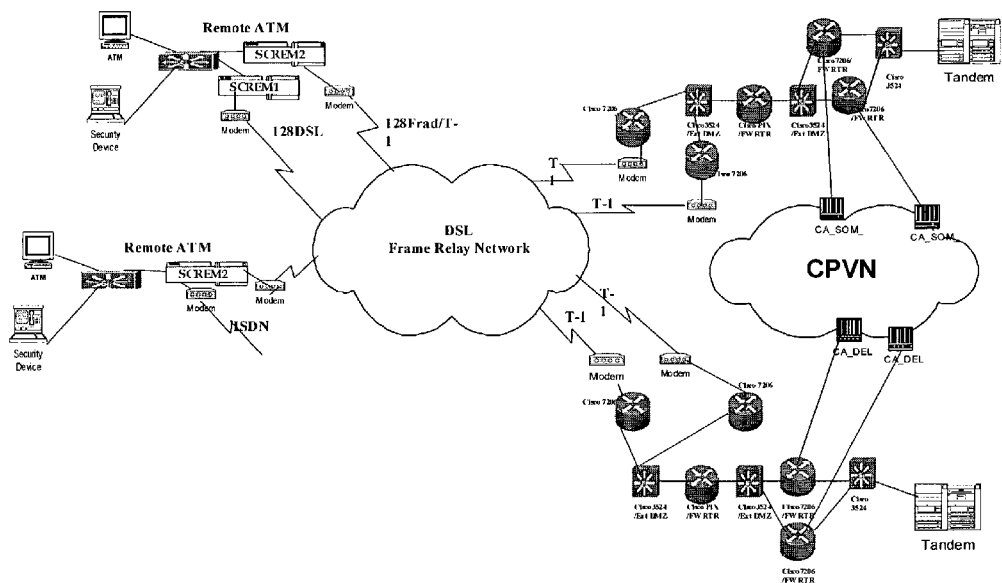
FIG. 9 is a depiction of the network infrastructure according to one embodiment of the invention.
Figure 10:
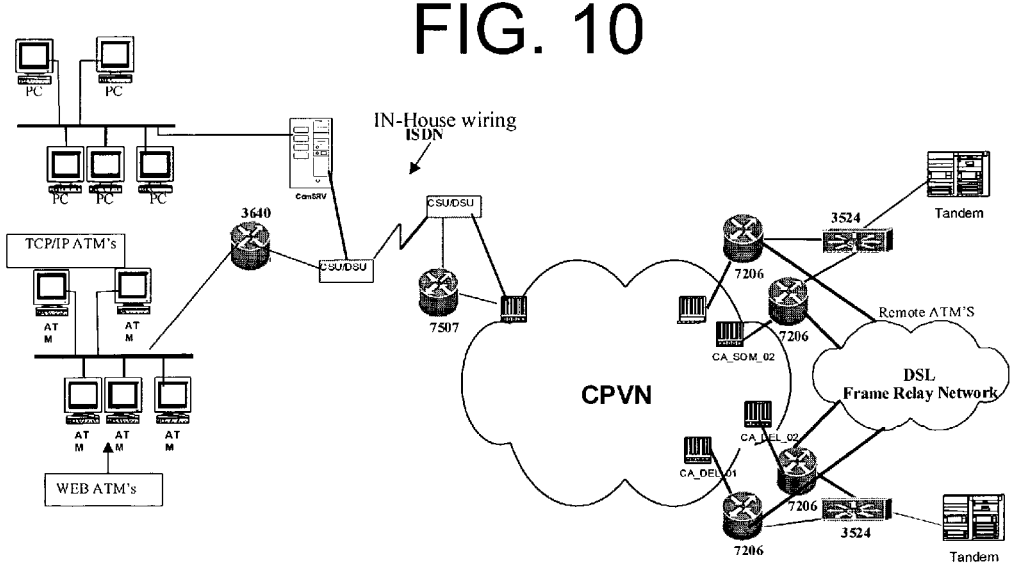
FIG. 10 is a depiction of the network infrastructure according to one embodiment of the invention.
Figure 11:
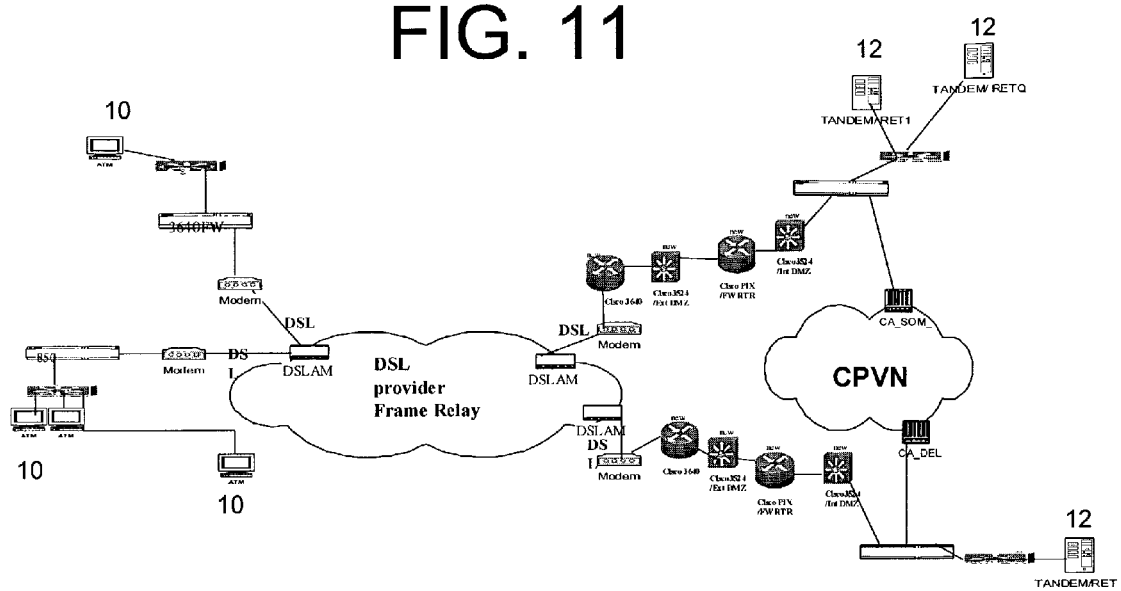
FIG. 11 is a depiction of the network infrastructure according to one embodiment of the invention.

FIGS. 6-11 show the web enabled ATM 10 using various network infrastructures. FIG. 6 depicts the ATM 10 coupled to a host 12a or 12b via an Ethernet infrastructure. Each of the ATMs 10 is coupled to a primary host, 12a or 12b. Each ATM 10 is alternately connected to the other host as a back up if the primary host experiences a failure. Further, the ATMs 10 at a single branch or location are not all connected to the same primary host. This insures that if a primary host goes down, the ATMs 10 connected to the other host still function. If a host does go down, the ATMs 10 connected to that host will automatically be routed to their backup hosts. FIG. 7 is a depiction of a network utilizing a remote DSL network infrastructure. The operation of the ATMs 10 in this type of network is essentially the same as those described previously. FIG. 8 is a depiction of a network utilizing a branch Ethernet network infrastructure. FIG. 9 is an alternate embodiment of a remote DSL network infrastructure including a security device. As shown in FIG. 10, the ATMs 10 as well as the branch PCs can utilize the same ISDN network. Finally, FIG. 11 shows another embodiment of a DSL infrastructure.

Figure 12:
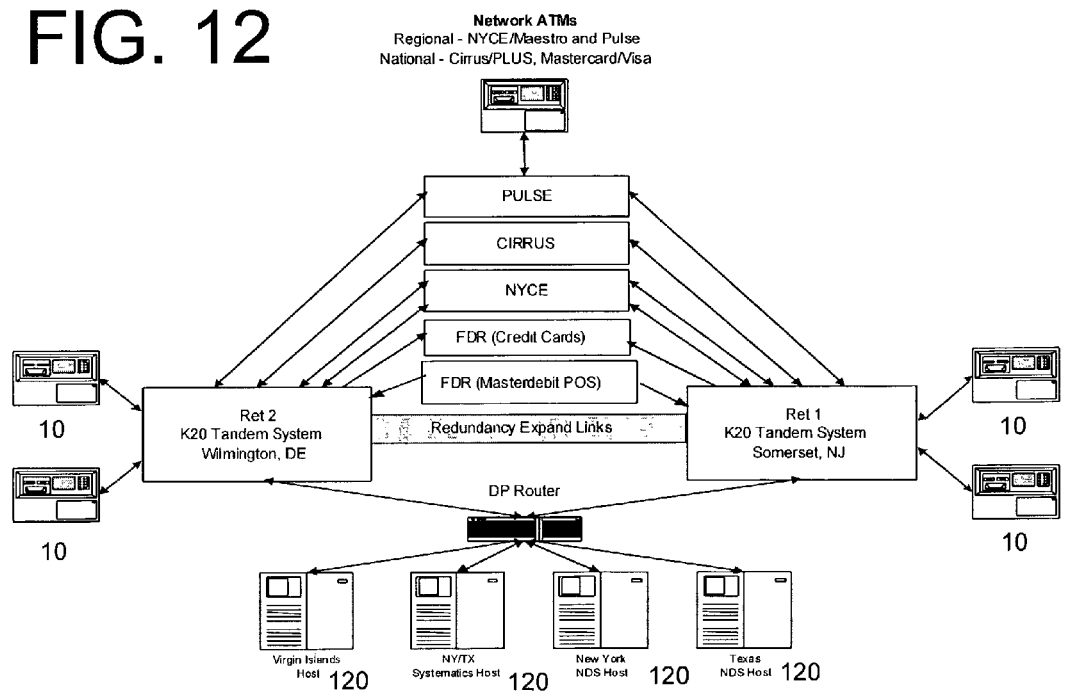
FIG. 12 is a depiction of the system architecture.

FIG. 12 is a depiction of the system architecture. As shown ATMs 10 are coupled to hosts. These hosts 120 are coupled for redundancy and back up purposes. Each host 120 is capable of communicating with other banks via ATM networks such as Pulse, NYCE, Cirrus, and the like. The web enabled ATM 10 is able to communicate with the provider's servers, using IFX or another command format, to request user profiles. The Logic server 104 in the ATM 10 is then able to customize the display and service offerings to present the user with a familiar display.

The ATM 10 of the present invention is also capable of operating in a mode for disabled persons, particularly those that are sight impaired ("ADA mode"). A Braille keypad is used for navigation. The ATM 10 enters the ADA mode when a headset is plugged into a headset port of the ATM. The ATM interface 120 (FIG. 3) detects the headset and a hardware event occurs. The hardware event causes the logic server 104 to blank the screen or display a logo or other non-transaction display. Transactions are not displayed for security purposes. The ATM 10 then uses voice commands to relay the information that would normally appear on the screen to the ADA user. The voice commands are either .wav files or synthesized speech. Synthesized speech is used in the preferred embodiment.

When the ATM is in ADA mode, logic server 104 manages the voice commands in a manner similar to the manner in which screen objects are managed. The logic server 104 selects screen objects using the same business rules as the non-ADA mode. These screen objects are then speech synthesized and presented to the user. In this manner, the messages the user hears are dynamically changed, similar to the way the screen objects are modified in the non-ADA mode.

FIG. 13 is a flowchart of a transaction in ADA mode. At the outset, the ATM 10 is awaiting a customer, displaying a welcome screen (Step 50). The ATM 10 is constantly monitoring whether a headset is plugged into the ATM 10 (Step 51). Once the headset is detected, the screen is blanked and the ADA welcome begins (Step 52). To enter the ADA mode the user must press enter after the welcome script (Step 53). Once the user presses enter, the system informs the user of the selections available on the main screen and instruct the user on how to make a given selection (Step 54). Using the logic server 104 and a voice synthesizer, the selections an ADA user hears are identical to those presented to a sighted user in the non-ADA mode. The user then makes a selection and swipes the bank card (Steps 55-59). Once the card is swiped, the user's profile is transmitted and the user is prompted to enter a PIN (Steps 59-61). The user is now able to complete the transaction i.e., make a withdrawal (Step 62). Alternatively, the user can swipe the card and enter a PIN before plugging in the headset or immediately after plugging in the headset.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. An Automated Teller Machine (ATM) system for displaying a customized screen of available account transaction options to a user of an ATM card, the ATM system comprising:
    an ATM comprising:
        a card reader for reading ATM card information from the ATM card,
        a display for enabling viewing of the customized screen of available account transaction options,
        a logic server coupled to the display, the logic server including components for accessing a user profile for the user based on the ATM card information and for receiving notification of at least one hardware event, wherein the hardware event is an event that when the ATM is unable to perform a task, the user profile including at least an account type and account rights for the user, the logic server implementing business rules for controlling content of the customized screen to be displayed on the display, the logic server including logic for enabling display of the customized screen of available account transaction options and disabling display of at least one unavailable account transaction option by applying the business rules to the account type, account rights, and hardware event to determine the at least one unavailable account transaction option, thereby creating the customized screen for the user, and
        a memory coupled to the logic server, the memory storing the user profile of at least the ATM card user; and
    a host, the host receiving the ATM card information over a network connecting the ATM unit and the host upon usage of the ATM unit by the ATM card user and retrieving the user profile for the ATM card user based on the ATM card information and sending the user profile over the network to the ATM unit.

2. The ATM system as recited in claim 1, wherein the ATM unit further comprises:
    a machine interface, the machine interface providing an interface to physical devices in the ATM.

3. The ATM system as recited in claim 1, wherein the ATM unit further comprises:
    a printer; and
    a cash dispenser, wherein the machine interface receives a status of the printer and the cash dispenser.

4. The ATM system as recited in claim 3, wherein the logic server dynamically modifies the content of the screens in response to the status of one of the printer and the cash dispenser.

5. The ATM system as recited in claim 1, further comprising:
    a host interface coupled to the logic server and coupled to the network, wherein the host interface provides an interface to the host.

6. The ATM system as recited in claim 5, wherein said host interface further comprises:
    an Interactive Financial Exchange proxy, the Interactive Financial Exchange proxy performing Interactive Financial Exchange formatting.

7. The ATM system as recited in claim 1, wherein the logic server is part of a user interface, the user interface further comprising:
    a browser coupled to the logic server and the display;
    a screen object module coupled to the logic server, wherein said screen object module contains objects to be displayed on the display; and
    a multilanguage engine coupled to the logic server, wherein the multilanguage engine operates with the logic server to provide multiple language options on the screens.

8. The ATM system as recited in claim 1, wherein the logic server dynamically modifies the content of the screens in response to the user profile.

9. The ATM system as recited in claim 1, wherein the ATM unit further comprises:
    an audio port, the ATM providing audio prompts after detecting a headset in the audio port, the audio prompts providing user instructions.

10. The ATM system as recited in claim 9, wherein said audio prompts are synthesized from the content.

11. The ATM system as recited in claim 1, wherein the network is the Internet.

12. The ATM system as recited in claim 1, wherein the network is a virtual private network.

13. The ATM system as recited in claim 1, wherein the network is an intranet.

14. The ATM system as recited in claim 1, wherein the network is a telephone system.

15. The ATM system as recited in claim 14, wherein communication over the telephone system is accomplished using asymmetric transfer mode.

* * * * *